(12) United States Patent (10) Patent No.: US 8,684,439 B1
Calvert (45) Date of Patent: Apr. 1, 2014

(54) TELESCOPING SIDE RAILS FOR A PICKUP TRUCK

(71) Applicant: TSR Associates, Trustee for TSR CRT Trust, Manassas, VA (US)

(72) Inventor: S. Mill Calvert, Manassas, VA (US)

(73) Assignee: TSR Associates, Manassas, VA (US), Trustee for TSR CRT Trust ( * ) Notice: Subject to any disclaimer, the term of this patent is extended or adjusted under 35 U.S.C. 154(b) by 0 days.

(21) Appl. No.: 13/952,951

(22) Filed: Jul. 29, 2013

(51) Int. Cl.
*B60P 3/00* (2006.01)

(52) U.S. Cl.
USPC .................................................. 296/36; 296/3

(58) Field of Classification Search
USPC ................. 296/3, 36, 6, 7, 8, 9, 183.1, 186.1, 296/186.4
See application file for complete search history.

(56) References Cited

U.S. PATENT DOCUMENTS

| | | | |
|---|---|---|---|
| 4,603,901 A * | 8/1986 | McIntosh et al. | 296/165 |
| 4,639,034 A * | 1/1987 | Amos | 296/100.18 |
| 4,703,969 A | 11/1987 | Rayburn et al. | |
| 4,779,916 A * | 10/1988 | Christie | 296/3 |
| 4,848,830 A * | 7/1989 | Parson | 296/165 |
| 5,303,969 A | 4/1994 | Simnacher | |
| 6,152,510 A | 11/2000 | Newsome | |
| 6,340,195 B1 | 1/2002 | Hall et al. | |
| 6,592,162 B2 | 7/2003 | Felix et al. | |
| 6,983,968 B2 * | 1/2006 | Brauer et al. | 296/3 |
| 7,104,583 B2 | 9/2006 | Clare | |
| 7,182,177 B1 | 2/2007 | Simnacher | |
| 2003/0127875 A1* | 7/2003 | Hornick | 296/32 |
| 2008/0079277 A1* | 4/2008 | Wethington | 296/3 |

* cited by examiner

*Primary Examiner* — Joseph Pape
(74) *Attorney, Agent, or Firm* — Louis Ventre, Jr.

(57) ABSTRACT

Telescoping side rails for a pickup truck are extensible, hidden vertical pillars within each side wall of a pickup truck. The extensible vertical pillars are connected at the top by the side rail sitting atop the side walls. A set of telescoping pillars is added to each of the two side walls bordering the bed of the pickup truck. When extended, either manually or via a powered option, the vertical pillars, which are joined at the top by the side rail, form a skeleton structure of a tall side wall. The side rail is an added stabilizing connection. The skeleton structure can be used alone or with added horizontal beams inserted through horizontal access ports in the extended pillars. Preferably, the access ports allow passage of a standard 2×4 or other stake through the pillars to create added structural stability to each set of telescoping pillars.

10 Claims, 6 Drawing Sheets

TELESCOPING SIDE RAILS FOR A PICKUP TRUCK

TECHNICAL FIELD

In the field of land vehicles, a pickup truck has a bed with side walls containing telescoping side rails that extend the height of the side walls to better contain taller loads within the bed.

BACKGROUND ART

Pickup trucks and vehicles having open cargo compartments, often called beds, are sometimes used for tall and bulky loads, such as refrigerators and dressers. Many trucks are purchased by people having only an occasional need for carting goods, such as weekend home repair products, or lawn fertilizer. For these truck owners, a pickup truck is a potentially useful vehicle that is can make it easy to carry bulky loads, but perhaps more importantly, also serve as a primary transport vehicle most of the time. It is important for this kind of user to have a pickup truck that can double as a family vehicle, without having the look of a contractor's vehicle.

Tie down brackets and after-market fencing installed at the edges of the bed are known to contain and immobilize bulky cargo being transported in the bed. The fencing solution particularly involves unsightly additions of fencing installed to raise the sidewalls of the truck. This is often called sake and rail fencing and it typically involves fencing installed so that when not in use, it is exposed to viewing on the inner face of the side walls, or has to be manually uninstalled and stored elsewhere. Thus, the background art discloses after-market elevated sidewalls where the user has options to deploy devices that enable him to erect the fencing with attachments against the sidewalls, rotate a hinged extension upward, or extend fencing stored against the sidewalls.

An additional problem occasionally encountered is transport of bulky cargo with a prospect of the inclement weather during the trip. Prior art often employs separately purchased plastic sheeting. The user then covers or wraps the cargo with rope or tape. Pre-installed cargo bed tops are typically installed at the top of the side wall or have limited additional added height, usually not more than the height of the cab at the front of the truck. These are often unusable for tall and bulky articles. So covering the cargo or the entire bed can be helpful, but again is often subject to the vagaries of ad hoc solutions.

SUMMARY OF INVENTION

Telescoping side rails for a pickup truck is a system to add extensible, hidden vertical pillars within each side wall of a pickup truck. The extensible vertical pillars are connected at the top by the side rail sitting atop the side walls. A set of telescoping pillars is added to each of the two side walls bordering the bed of the pickup truck. When extended, either manually or via a powered option, the vertical pillars, which are joined at the top by the side rail, form a skeleton structure of a tall side wall. The side rail is an added stabilizing connection. The skeleton structure can be used alone or with added horizontal beams inserted through horizontal access ports in the extended pillars. Preferably, the access ports allow passage of a standard 2×4 or other stake through the pillars to create added structural stability to each set of telescoping pillars. Each side rail may also have a downwardly facing channel and an upwardly facing channel on the side wall that can be used to slide in a 4×8 sheet of plywood. A set of inwardly facing channels can be used to slide in two 4×8 sheets to form a top to the bed. A tarpaulin may be included to snap on to male snap fasteners placed on the pillars so that the tarp can in effect serve to create a covered wagon, with the tarp extended from one side wall up and over the elevated pillars and down to the other side wall to cover the cargo in the bed.

Technical Problem

A traditional pickup truck has practical limitations to transporting tall and bulky loads. Most people do not have the means to stabilize tall loads and are not interested in creating a contractor's truck with an ugly after-market structure. Aside from the occasional owner frustration, this situation can also present a danger to others from extra-slow transport or from cargo tumbling over a sidewall when the vehicle attempts a turn or makes an unexpectedly fast stop.

Solution to Problem

At the push of a button, or even manually, the owner of a pickup truck can raise the side rails connected to telescoping pillars hidden within the side walls of the pickup truck. The skeleton structure of extended pillars connected on each side at the top by the side rails is sufficiently rigid to support tall loads in the bed of the truck. Horizontal 2×4's can be added through holes in the pillars to add to the structural enclosure. These can also be added across the bed to structurally link the extended side walls to each other. Also, a 4×8 plywood sheet can be slid in place at the side wall using inverted channels at the top and bottom of the extended wall: one channel facing downward at the top on the side rail and another at the top of the side wall facing upward. To form a top cover, two 4×8 plywood sheets can be slid in place over the bed using channels facing each other on the side rails. A tarp with snap-on fasteners can be used to cover the extended side walls and form a flexible top over the bed.

Advantageous Effects of Invention

The system for telescoping side rails for a pickup truck hides the extended side walls until there is a need for them. When the need arises for transport of a tall item, a pickup truck operator effortlessly pushes a button and transforms the standard low-profile side walls to extended side walls capable of securing the tall item for transport. An easy lift up can also be done by hand and without a powered system. When finished with that transport, the operator can just as easily retract the extended side walls into the standard low-profile side walls to again hide the structure comprising the extended side walls.

The system also comes with an all-weather flex top that rolls up and stores in a small bag. The flex top can be slid over the top of the extended side wall structure and fastened to the bottom sides with snaps or other fastener. Once installed, it acts just like a truck cap, so that one can lock up materials in the bed of the truck, keep articles in the bed dry while driving in the rain, or use it as a camping tent with sleeping bags on the bed.

This system permits expanded sales of pickup trucks to weekend do-it-yourselfers who prefer not to have a contractor's truck with an ugly rack system.

BRIEF DESCRIPTION OF DRAWINGS

The drawings illustrate preferred embodiments of the telescoping side rails for a pickup truck according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
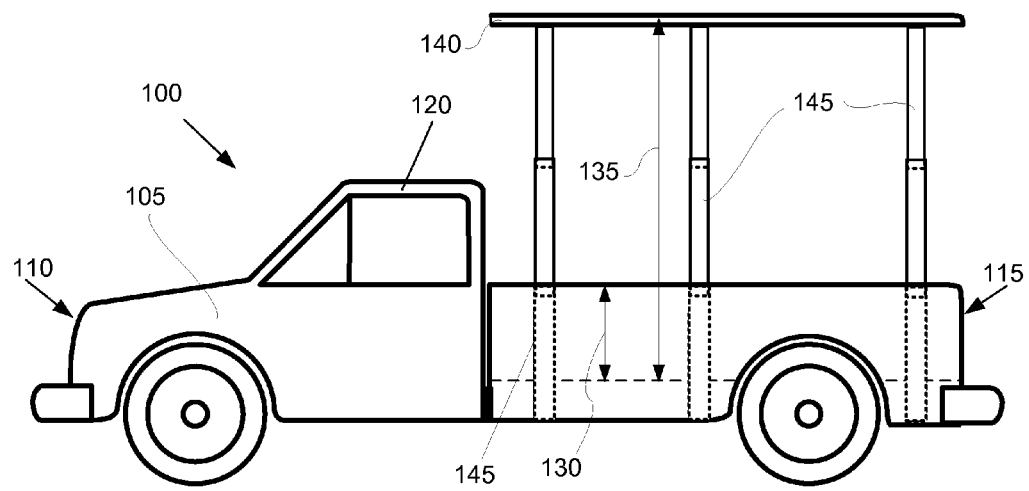
FIG. 1 is a side elevation view of a pickup truck with the telescoping side rails in extended position.
Figure 2:
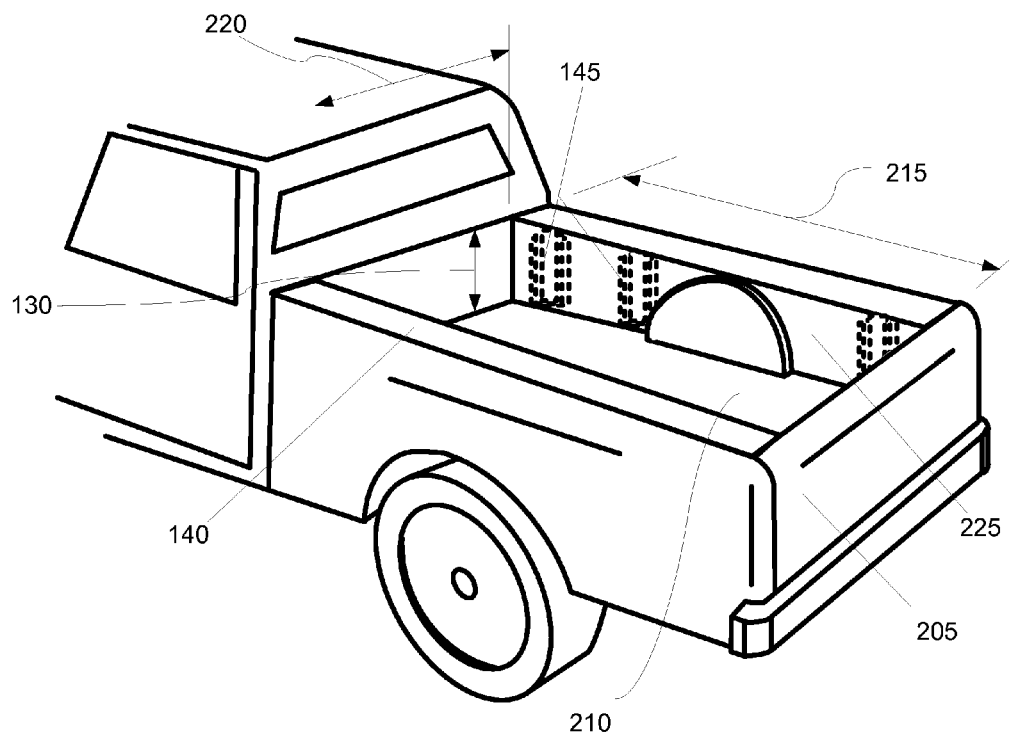
FIG. 2 is a perspective of the rear end of a pickup truck with the telescoping side rails in stowed position.

The telescoping side rails described herein are best implemented in a system (100) including a pickup truck (105). The pickup truck (105) is more easily described with reference to FIG. 1, FIG. 2 and FIG. 6. The pickup truck (105) involved in the system (100) is preferably a standard pickup truck commonly available from all of the large vehicle manufacturers.

The pickup truck (105) has a front (110), a rear (115), a truck-left-side (615) and a truck-right-side (620), which are illustrated so that other components can be referenced in respect thereto. The pickup truck (105) has a cab (120) at the front (110) of the pickup truck (105). The cab (120) could hold two or more people and have a front seat and or an additional seating compartment immediately behind the front seat.

The pickup truck (105) preferably has a tailgate (205) at the rear (115) of the pickup truck (105). Embodiments without a tailgate (205) are possible as this is not an essential component for operability of the system (100).

The pickup truck (105) has a bed (210) between the cab (120) and the tailgate (205). The bed (210) is a typical cargo area for the pickup truck (105). The bed (210) has a bed-length (215) and a bed-width (220), as is common in all pickup trucks. The bed-length (215) is approximately defined by the distance from the tailgate (205) to the cab (120). It is approximate because the bed-length can vary depending on where the wall of the bed area starts behind the cab. The bed-width (220) is approximately defined by the distance between the two side walls, each side wall (225) rising vertically from the bed (210) to a first height (130). It is approximate because the rear wheel wells typically extend out from the side wall (225) to narrow usable bed width.

The pickup truck (105) has a side rail (140) atop each side wall (225). Pickup trucks typically have a side rail or cap sitting on the side wall (225) as a finishing feature to close up the side walls. Each said side rail (140) has a rail-length approximately equal to the bed-length (215), which is more or less, the same as the length of the side-wall.

Figures 8, 9:
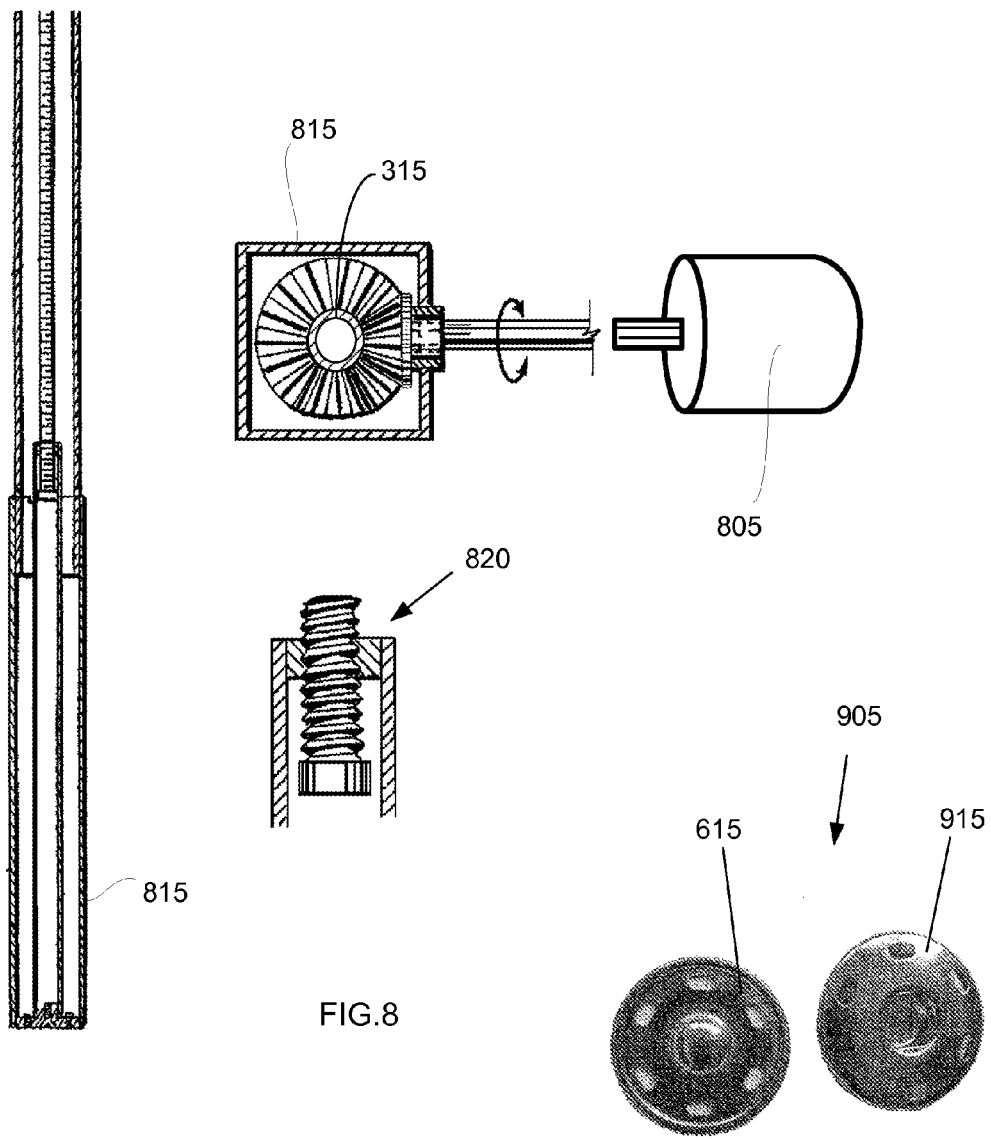
FIG. 8 is a sectional elevation view of a square telescoping side rail and illustrating a motorized screw drive.
FIG. 9 is a top view of a mating snap portions used with the tarpaulin.
Figure 10:
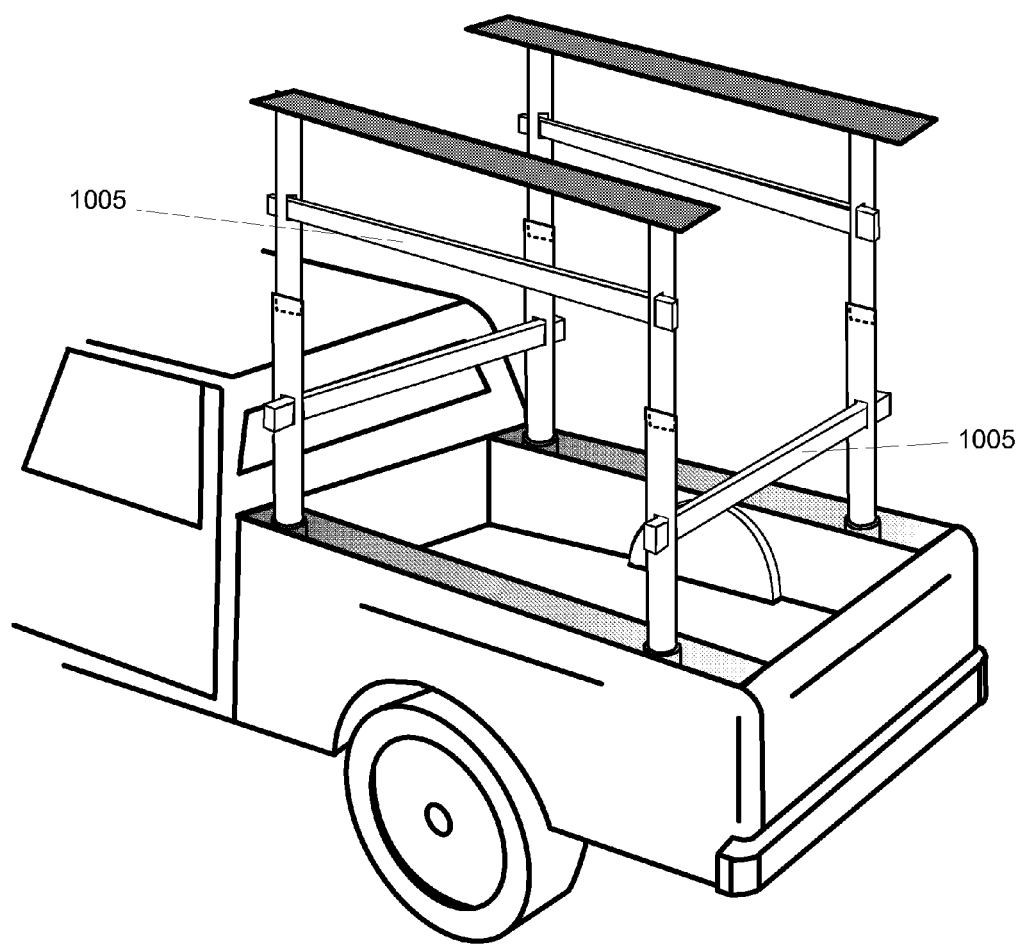
FIG. 10 is a partial perspective view of a pickup truck with horizontal beams threaded through holes in the telescoping extension poles.

The system (100) further includes a plurality of telescoping extension poles (145) vertically positioned within each side wall (225). This plurality is two or more nested telescoping extension poles. A pickup truck with two telescoping extension poles on each side is illustrated in FIG. 10. The poles may have any cross-section, such as round and square. FIG. 8 illustrates a square pole (815).

Each telescoping extension pole in the plurality of telescoping extension poles (145) comprises a plurality of pole sections. Here again this plurality is two or more pole sections. The plurality of pole sections includes a pole top-section (305) and a pole bottom-section (315). When three pole sections are used, there is a pole middle-section (310). Each such telescoping extension pole is connected at the pole top-section (305) to the side rail (140) and immobilized at the pole bottom-section (315). The top end of the pole top-section (305) is attached to the side rail (140), for example, by welding. Other means of attachment may be used.

Each such telescoping extension pole is capable of being extended upward to a second height (135) when the side rail (140) is at the first height (130). For example, for a two section pole, the pole top-section (305) would extend upward and the pole bottom-section would be fixed in place. Since the side rail (140) connects all of the telescoping extension poles in the plurality of telescoping extension poles (145) in each side wall (225), necessarily all of the telescoping extension poles in the plurality of telescoping extension poles (145) in each side wall (225) extend or retract in unison or at the same time.

The system (100) includes a lock (325), which secures the plurality of pole sections in position with respect to each other when the side rail (140) is at a distance above the first height (130).

The lock may be as simple as holes through a pole section with a bolt to prevent movement of the pole sections. Thus, in one embodiment each telescoping extension pole defines a plurality of horizontal bolt holes (330) arranged vertically when the side rail (140) is at the second height (135); and the lock (325) comprises a bolt for each telescoping extension pole, the bolt fitting within one of the bolt holes to physically preclude relative movement of any section in the plurality of sections when the side rail (140) is at a distance above the first height (130).

In another embodiment, the lock (325) is a spring-biased detent (410) that automatically engages when it passes a hole in an adjoining nested pole section. This hole can be placed in one or more vertical positions, but it is preferably at least engageable when the telescoping extension poles are positioned at the second height (135). The spring-biased detent (410) is a common push-button that springs out into a hole in a nested pole section. It is released by pressing the push-button, which re-enables one pole section to slide within another.

Figure 3:
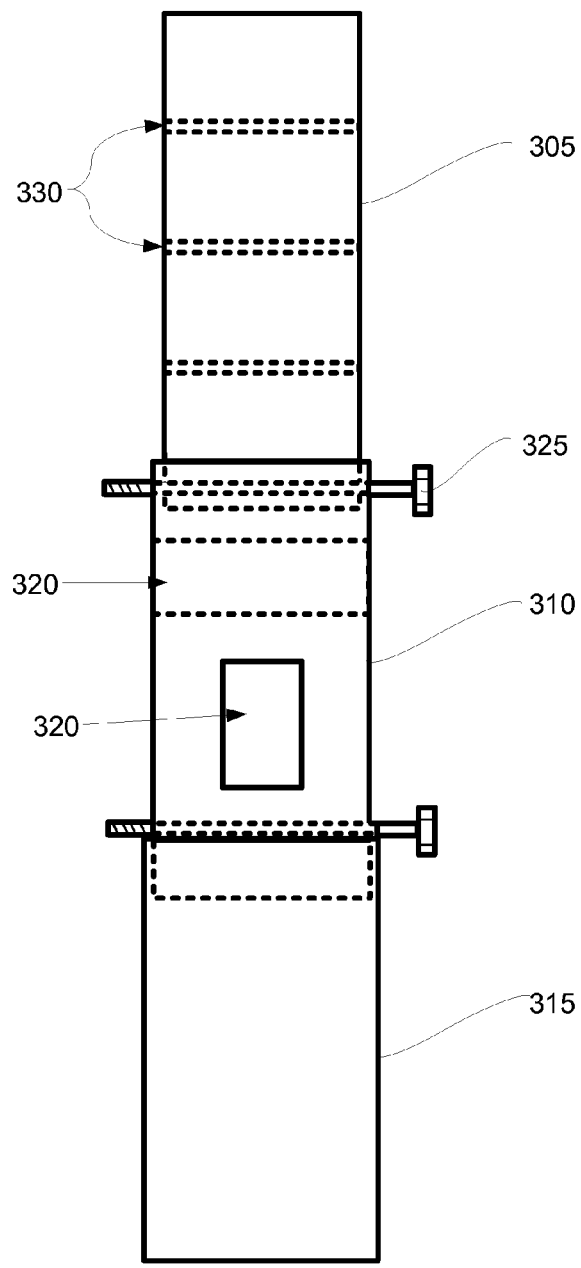
FIG. 3 is an elevation view of telescoping extension poles with bolts and holes for height adjustment.
Figure 4:
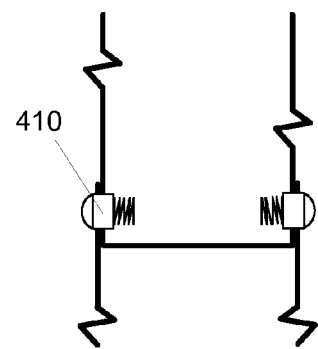
FIG. 4 is a sectional elevation view of the junction of two extended telescoping extension poles showing a push button detent used to lock the poles in position.

As shown in FIG. 3, each telescoping extension pole preferably defines an opening (320) extending horizontally through each telescoping extension pole. This is a hole in each telescoping extension pole that is preferably at the same height in each telescoping extension pole. While one or more openings may be present, each opening (320) should be accessible once the side rail (140) is at the second height (135). The system (100) with an opening (320) also includes a horizontal beam (1005), shown in FIG. 10, that fits within each opening (320) to structurally connect telescoping extension poles. These can be inserted along the bed-length (215) or across the bed-width (220) as may be desired for increased structural stability. A screw or other means may be used to secure each horizontal beam (1005) in place.

When the plurality of pole sections includes a pole middle-section (310), it is preferable that the opening (320) is through the pole middle-section (310) to connect telescoping extension poles in a side wall (225).

FIG. 8 illustrates a portion of a preferred embodiment of the system (100) with a motor (805) that drives the extension and retraction of the plurality of telescoping extension poles (145) using a threaded connection (820). There is preferably one motor for each side wall (225), although some embodiments may have one motor operating the plurality of telescoping extension poles (145) in both side walls. The motor (805) may operate on one telescoping extension pole in the plurality of telescoping extension poles (145) because when one pole extends the others connected by the side rail (140) must also extend. Thus, the motor (805) is operatively connected to at least one telescoping extension pole in each side wall (225) to power the extension of the telescoping extension pole and raise the side rail (140) from the first height (130) to the second height (135) when the motor (805) is activated. For operator convenience, the motor (805) is preferably operated from within the cab.

Figure 5:
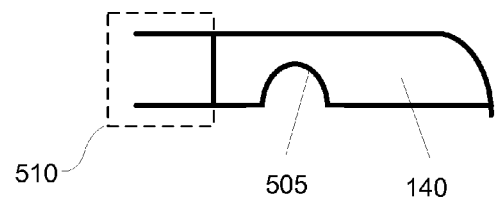
FIG. 5 is a side elevation view of a side rail showing a downwardly curved C-shaped segment and a channel.
Figure 6:
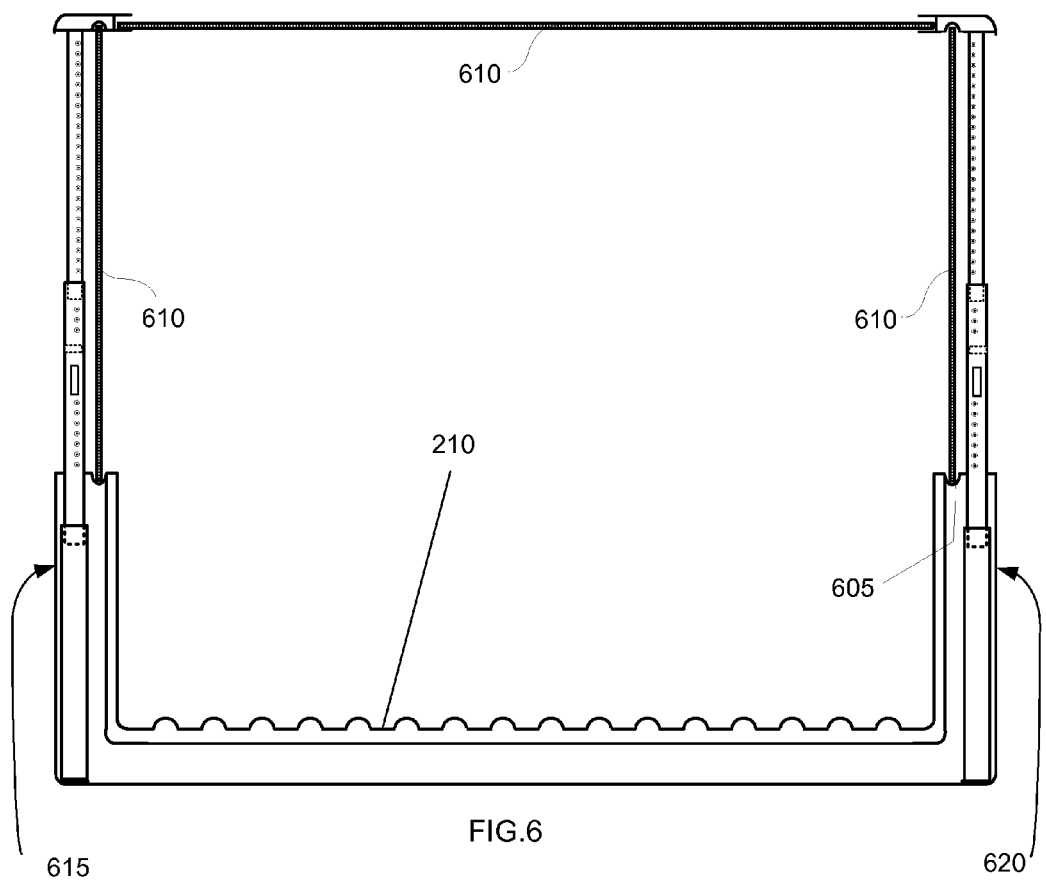
FIG. 6 is a sectional elevation view of the rear end of a pickup truck showing two extended telescoping extension poles with plywood sheets installed on the sides and top of the truck.
Figure 7:
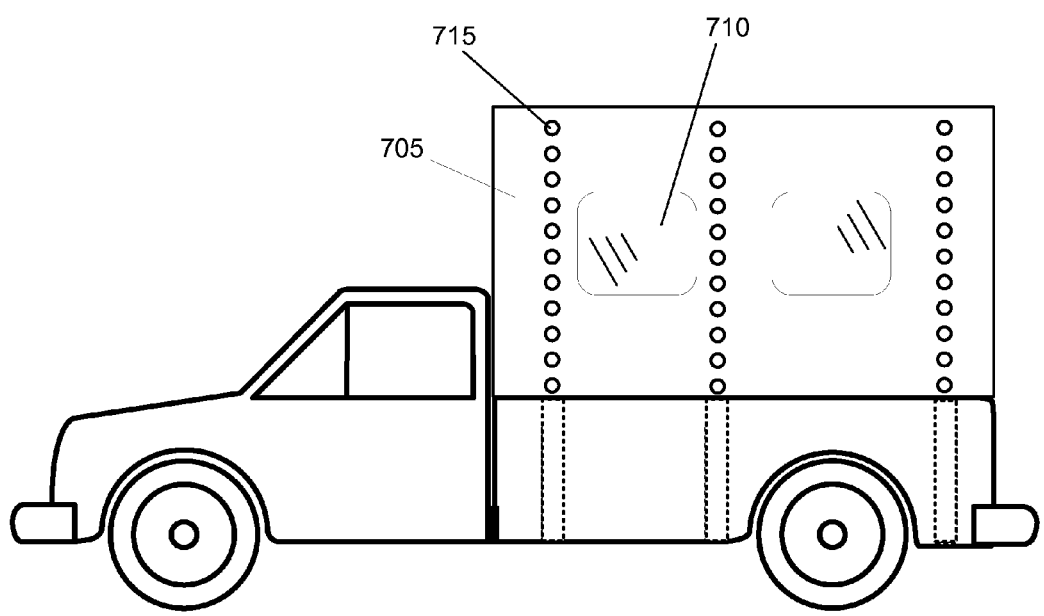
FIG. 7 is a side elevation view of a pickup truck with the telescoping side rails in extended position and a tarpaulin snapped on three extended telescoping extension poles on the left side of the pickup truck.

Instead of an added horizontal beam (1005), the system (100) may be reinforced by plywood sheets, which may be cut to suit the particular size pickup truck width or length. Larger pickup trucks usually are sized to hold a standard 4×8 foot sheet of plywood in the bed. For this embodiment, FIGS. 5 and 6, show each side rail (140) having a downwardly curved C-shaped segment (505) positioned above an upwardly curved C-shaped segment (605) in the side wall (225) when the side rail (140) is at the second height (135). This alignment and an appropriate distance between them could then permit sliding a 4 foot wide sheet of plywood into the C-shaped segments along the length of the pickup truck. Preferably, the distance above the first height (130) to the side rail (140) is sufficient to slide a 4 foot wide sheet of plywood (610) in between the downwardly curved C-shaped segment (505) and the upwardly curved C-shaped segment (605) and be held in place therein.

In addition, an embodiment of the system (100) has a channel (510) on each side rail (140), shown within the dashed box in FIG. 5. There is no substantive distinction intended by the use of the two terms: C-shaped segment and channel. The different terms are used as a matter of convenience and clarity to avoid confusion of terms in this description. They are illustrated differently merely to show some diversity in their potential designs. As can be seen with reference to FIG. 6, the channels face each other. Each channel (510) is of sufficient size to slide a sheet of plywood (610) between them and to retain the sheet of plywood (610) between the channels to form a top or cover to the bed.

Each side wall (225) can be thought of as defining a side to the truck. One of the side walls defines a truck-left-side (615) and the other of the side walls defines a truck-right-side (620). An embodiment of the system (100) includes a cover or tarpaulin (705) of sufficient size to extend from the truck-left-side (615) at the first height (130) up and over the side rail (140) at the second height (135) on the truck-left-side (615) across the bed-width (220) to the side rail (140) on the truck-right-side (620) at the second height (135) and down to the first height (130) on the truck-right-side (620). The tarpaulin (705) may be canvas, plastic or any other material suitable for a cover to the bed (210).

The tarpaulin (705) may be secured by any means. For example it may have reinforced holes and ties or preferably have mating snap portions (905). Thus, an embodiment with a tarpaulin (705) includes mating snap portions (905) positioned on the tarpaulin (705) and the plurality of telescoping extension poles (145) to permit securing the tarpaulin (705) in place to form a cover over the bed. Preferably, a male snap portion (715) is on the tarpaulin (705) and a female snap portion (915) is on the plurality of telescoping extension poles (145) in each side wall (225).

The tarpaulin (705) may have a transparent plastic window (710) to enable someone within the bed to look out. This might be convenient when the truck bed with the cover is used as a tent for sleeping. Thus, a preferred embodiment with a tarpaulin (710) has one or more plastic windows positioned on the tarpaulin (710). The term plastic is intended to be construed broadly to include any transparent synthetic material.

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the automobile industry.

What is claimed is:

1. A system comprising:
a pickup truck, the pickup truck comprising:
    a front and a rear;
    a cab at the front of the pickup truck;
    a tailgate at the rear of the pickup truck;
    a bed between the cab and the tailgate, the bed having a bed-length and a bed-width, the bed-length approximately defined by the distance from the tailgate to the cab, the bed-width approximately defined by the distance between two side walls, each side wall rising vertically from the bed to a first height; and
    a side rail atop each side wall, each said side rail having a rail-length approximately equal to the bed-length;
a plurality of telescoping extension poles vertically positioned within each side wall,
    each telescoping extension pole in the plurality of telescoping extension poles comprising a plurality of pole sections, the plurality of pole sections comprising a pole top-section and a pole bottom-section,
    each such telescoping extension pole connected at the pole top-section to the side rail and immobilized at the pole bottom-section; and
    each such telescoping extension pole capable of being extended upward to a second height when the side rail is at the first height;
a lock securing the plurality of pole sections in position with respect to each other when the side rail is at a distance above the first height; and
wherein each telescoping extension pole defines an opening extending horizontally through each telescoping extension pole, said opening being accessible once the side rail is at the second height; and further comprising a horizontal beam that fits within each opening to structurally connect telescoping extension poles.

2. The system of claim 1, wherein the plurality of pole sections further comprises a pole middle-section; and the opening is through the pole middle-section to connect telescoping extension poles in a side wall.

3. The system of claim 1, wherein the lock is a spring-biased detent that automatically engages when the telescoping extension poles are positioned at the second height.

4. The system of claim 1, further comprising a motor operatively connected to at least one telescoping extension pole in each side wall to power the extension of the telescoping extension pole and raise the side rail from the first height to the second height when the motor is activated.

5. The system of claim 1, wherein:
each side rail comprises a downwardly curved C-shaped segment positioned above an upwardly curved C-shaped segment in the side wall when the side rail is at the second height; and
the distance above the first height to the side rail is sufficient to slide a 4 foot wide sheet of plywood in between the downwardly curved C-shaped segment and the upwardly curved C-shaped segment and be held in place therein.

6. The system of claim 1, wherein each side rail comprises a channel, the channels facing each other, the channels of sufficient size to slide a sheet of plywood between them and to retain the sheet of plywood between the channels to form a top to the bed.

7. The system of claim 1, wherein:
each telescoping extension pole defines a plurality of horizontal bolt holes arranged vertically when the side rail is at the second height; and
the lock comprises a bolt for each telescoping extension pole, the bolt fitting within one of the bolt holes to physically preclude relative movement of any section in the plurality of sections when the side rail is at a distance above the first height.

8. The system of claim 1:
wherein one of the side walls defines a truck-left-side and the other of the side walls defines a truck-right-side; and
further comprising a tarpaulin of sufficient size to extend from the truck-left-side at the first height up and over the side rail at the second height on the truck-left-side across the bed-width to the side rail on the truck-right-side at the second height and down to the first height on the truck-right-side.

9. The system of claim 8, further comprising mating snap portions positioned on the tarpaulin and the plurality of telescoping extension poles to permit securing the tarpaulin in place to form a cover over the bed.

10. The system of claim 8, further comprising a transparent plastic window positioned on the tarpaulin.

\* \* \* \* \*